Dec. 9, 1958  P. S. VILES  2,863,828
METHOD OF REMOVING ORGANIC PEROXIDES FROM
ALKALI HYPOCHLORITE TREATING SYSTEM
Filed Nov. 21, 1955
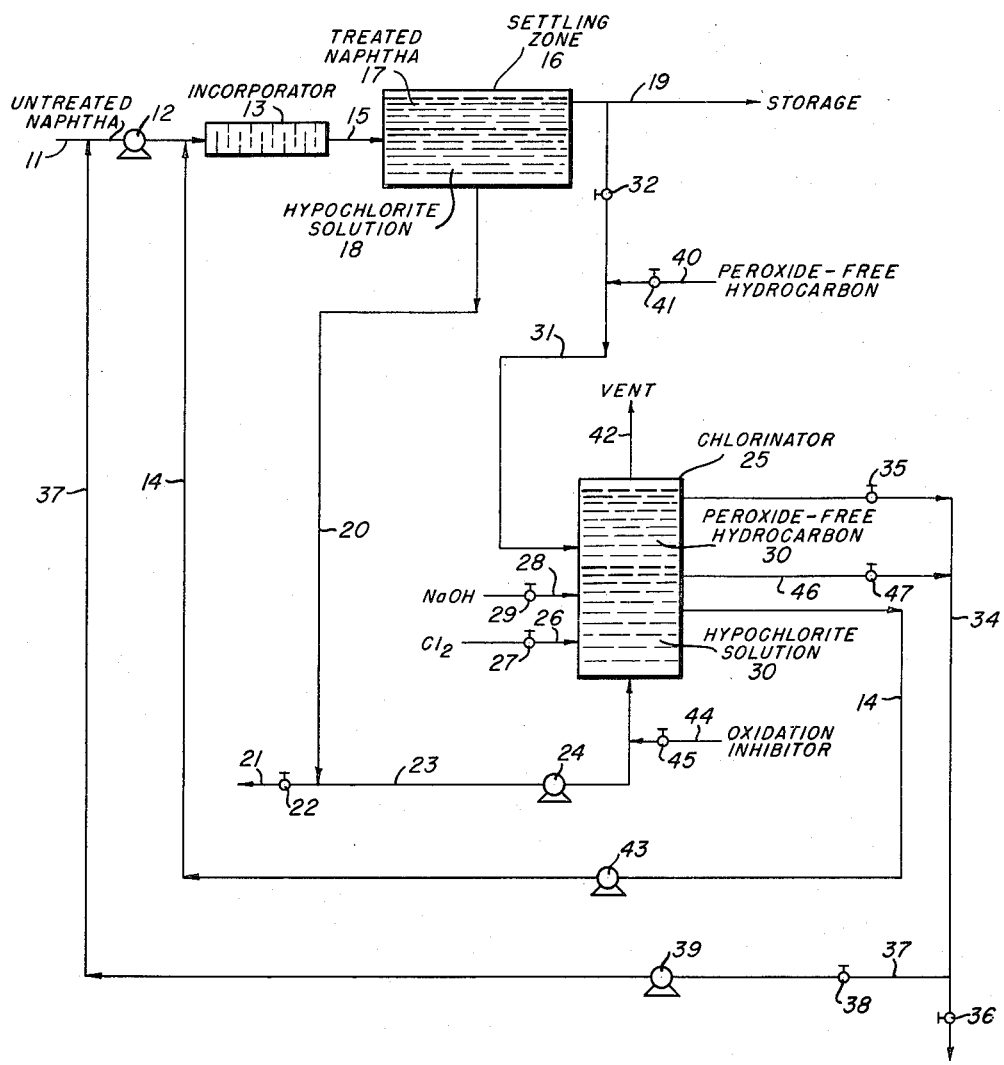
INVENTOR.
Prentiss S. Viles
BY
ATTORNEY.

United States Patent Office
2,863,828
Patented Dec. 9, 1958

2,863,828

METHOD OF REMOVING ORGANIC PEROXIDES FROM ALKALI HYPOCHLORITE TREATING SYSTEM

Prentiss S. Viles, Baytown, Tex., assignor, by mesne assignments, to Esso Research and Engineering Company, Elizabeth, N. J., a corporation of Delaware Application November 21, 1955, Serial No. 548,152

12 Claims. (Cl. 208—190)

The present invention is directed to the sweetening of petroleum distillates with alkaline hypochlorite solutions. More particularly, the invention relates to the sweetening of petroleum distillates with alkaline hypochlorite solutions and the prevention of explosions in vessels used in said operations.

In the operation of the hypochlorite treating system in which the vessels are constructed of carbon steel, the corrosiveness of the alkaline hypochlorite solution ordinarily experienced is overcome by maintaining a very high ratio of free caustic alkalinity to available chlorine content in the sweetening solution which is normally recirculated through the treating system until it is substantially spent. The proper ratio of free alkalinity to available chlorine content is maintained by adding continuously to the strongly alkaline treating solution small amounts of gaseous chlorine prior to circulation of the alkaline hypochlorite treating solution through the mixer and settling vessels wherein the petroleum distillate is contacted with the treating solution. This chlorine is added to the strongly alkaline treating solution in a vented storage drum from which the treating solution is circulated through the treating vessels. The recirculated hypochlorite solution may be used until its free caustic content is reduced to the point that the proper ratio of free caustic to available chlorine content is difficult to maintain and then it may be discarded. Alternatively, the free caustic may be added to the solution to maintain the caustic content at the proper level.

This type of operation is successful from both equipment corrosion and operating standpoints and has been very useful. However, when processing petroleum distillates which are susceptible to organic peroxide formation, considerable difficulty is experienced due to the concentration of organic peroxides in the layer of the petroleum distillate which accumulates on the surface of the recirculated hypochlorite solution in the chlorinator vessel. The organic peroxides may reach a sufficiently high concentration in the chlorinator vessel and spontaneously explode.

In accordance with the present invention, explosions are prevented in chlorinating vessels of hypochlorite treating systems and peroxide formation is maintained below an explosive level by reducing the concentration of organic peroxide in the vessel below the level at which spontaneous explosions occur. The concentration of peroxides may be maintained below the danger level by flushing from the chlorinator vessel the accumulated layer of petroleum distillate which appears on the hypochlorite solution. In other words, the accumulation of petroleum distillate is replaced by a peroxide-free hydrocarbon.

The peroxide-free hydrocarbon may be a portion of the treated naphtha from which peroxides have been removed or it may be a peroxide-free hydrocarbon which is introduced from an extraneous source. The peroxide-free hydrocarbon may have a boiling range within the range of the feed stock charged to the hypochlorite treating system.

The temperature, at which the treating operation in accordance with the present invention may be conducted, may range from about 40° up to about 120° F. with temperatures in the range from 60° to 90° F. being preferred. When sweetening sour volatile hydrocarbons it may be necessary to superimpose pressure on the treating equipment to maintain the hydrocarbon in the liquid state.

The alkaline hypochlorite solution employed in the practice of the present invention may be prepared by any one of the well known methods of preparing hypochlorite solutions. A convenient method of preparing hypochlorite solution is merely to bubble chlorine gas into a solution of alkali metal hydroxide such as sodium hydroxide of proper strength to make the hypochlorite. While sodium hydroxide is the preferred alkali metal hydroxide, by virtue of its availability, it is within the scope of my invention to use other alkali metal hydroxides in lieu of sodium hydroxide; for example, potassium hydroxide and lithium hydroxide may be employed in the practice of my invention.

The alkaline hypochlorite solution may contain an excess of 90 grams of free sodium hydroxide per liter and available chlorine in excess of 1 gram per liter. However, the free caustic or sodium hydroxide may range from about 50 grams per liter up to about 200 grams per liter while the available chlorine will ordinarily range from about 10 grams per liter up to about 200 grams per liter.

The petroleum distillates employed as a feed stock in the present invention in which peroxides form may suitably boil in the range from about 100° F. up to about 700° F. Usually the feed naphtha or hydrocarbon will boil from about 100° to about 450° F. Suitable feed stocks may include gasoline, kerosene, and solvent naphtha fractions and may also include fractions which contain olefins and the like. Such fractions containing olefins and susceptible to peroxide formation are obtained in the cracking of petroleum hydrocarbons and specifically thermal and catalytic cracking operations. Catalytically cracked petroleum fractions are especially susceptible and prone to the formation of peroxides. Polymerized olefinic fractions may also form peroxides when allowed to stand and may form a feed stock to the present invention, especially when such polymerized fractions are sour and require treating.

The present invention will be further illustrated by reference to the drawing which is a flow sheet representing a preferred mode. Referring now to the drawing, an untreated naphtha, such as catalytically cracked naphtha, is introduced into the system through line 11 containing pump 12 and is pumped into an incorporator 13 which is of the baffle plate type which may suitably include any mixing device, such as centrifugal pumps, mixing towers, and the like. Added to the untreated naphtha in line 12 is an alkaline hypochlorite solution of the type mentioned before which is introduced thereto by line 14 from a source which will be described further hereinafter. The alkaline hypochlorite solution in admixture with the treated naphtha discharges from mixing device 13 by way of line 15 into a settling zone 16 which is of sufficient capacity to provide a residence time which allows a separation to be made between the treated naphtha and the hypochlorite solution within a reasonable length of time, approximately within about 30 to 120 minutes. The treated naphtha accumulates as an upper level in the vessel 16 and is shown as a layer 17 while the hypochlorite solution settles to the bottom of the zone 16 as layer 18.

The treated naphtha may be discharged from zone 16 by line 19 to storage, not shown. The hypochlorite solution is withdrawn from vessel or zone 16 by line 20 and may be discharged in part from the system by line 21 containing valve 22. Preferably, the greater portion or all of the hypochlorite solution in line 20 is routed by way of line 23 containing pump 24 to a chlorinator vessel 25. Chlorinator vessel 25 is provided with line 26 controlled by valve 27 for introducing chlorine gas continuously into the vessel 25. The vessel 25 may also be provided with line 28 controlled by valve 29 for introducing a caustic solution of the proper strength to maintain the proper causticity in the vessel 25.

Since some of the naphtha admixed with the hypochlorite solution in mixing zone 13 may not separate from the hypochlorite solution in zone 16, this naphtha may accumulate in the vessel 25 as an upper layer or level above the body 30 of hypochlorite solution in the chlorinator vessel 25. If this accumulated hydrocarbon is maintained in the vessel 25, explosions may occur which will cause damage to life and equipment.

In accordance with the present invention formation and accumulation of peroxides in vessel 25 are prevented by flushing the vessel 25 with a peroxide-free hydrocarbon which may be a portion of the treated naphtha withdrawn from line 19 by way of line 31 controlled by valve 32 and introduced thereby into vessel 25. This peroxide-free hydrocarbon replaces the accumulated naphtha in vessel 25 and may be illustrated as a body 33 which is continuously being renewed by the treated naphtha introduced by line 31. This body is flushed in and out of the vessel 25 and may be discharged therefrom by line 34 controlled by valve 35 with all or part of the discharged flushed hydrocarbons being discharged from the system by opening valve 36 in line 34. Preferably, however, the hydrocarbons flushed from vessel 25 are recycled to line 11 by way of branch line 37 controlled by valve 38 and containing a pump 39.

It may be desirable to obtain the peroxide-free hydrocarbon from an extraneous source and this may be done by connecting line 31 by way of line 40 controlled by valve 41 with a source of peroxide-free hydrocarbon which may have the same boiling range as the untreated naphtha. This is desirable such that the flushed hydrocarbons may be recycled and introduced into the system with the untreated naphtha.

Any gases from the chlorinator vessel 25 are vented therefrom by line 42.

The hypochlorite solution, after being refortified with chlorine and after having its alkalinity adjusted, as may be desired, is recycled to line 11 as has been described by way of line 14 containing a pump 43.

Rather than flush hydrocarbons from the vessel 25, as has been described, it may be desirable to maintain the concentration of peroxides in the accumulated hydrocarbon layer at a level below that at which explosions spontaneously occur by adding an oxidation inhibitor to the vessel 25 by lines 20 and 23. To this end, line 44 controlled by valve 45 is provided by way of which an oxidation inhibitor, such as 2,6,tertiary butyl phenols and similar types of alkyl substituted phenols and/or other caustic insoluble oxidation inhibitor such as phenylene diamine or similar types of aromatic amines may be added to the solution in line 23 or to drum 25. The caustic insoluble inhibitor dissolves in the accumulated liquid and maintains the organic peroxide level below explosive levels. It may be desirable, when the vessel is not flushed and an oxidation inhibitor is to be employed, to remove continuously or intermittently the hydrocarbons which may accumulate in body 33 and to this end there is provided a branch line 46 controlled by valve 47 by way of which accumulated hydrocarbons may be discharged into line 34 and thence from the system by opening valve 36 or recycled to line 11 by opening valve 38 in line 37.

It will be seen from the foregoing description taken with the drawing that a method has been provided for preventing explosions in hypochlorite treating systems.

In order to illustrate the invention further a sample of naphtha was obtained from a hypochlorite storage drum in which an explosion had occurred. This naphtha was found to have an organic peroxide content of 190 to 240 milliequivalents of active oxygen per liter. A sample of the same naphtha which had a peroxide content of 0 was stored for 11 days over fresh sodium hypochlorite solution. The peroxide content increased to 38 milliequivalents of active oxygen per liter.

In the practice of the present invention it is desirable to maintain the concentration of peroxide in the equivalent of vessel 25 at a level below about 10 milliequivalents of active oxygen per liter. Above this concentration explosions may spontaneously occur and damage and destroy the vessel and/or human life which may be nearby. By maintaining the peroxide concentration below a level of about 10 milliequivalents of active oxygen per liter the dangers of explosion are eliminated. One milliequivalent of active oxygen per liter is equal to about 8 parts per million of oxygen.

Explosions have been experienced in hypochlorite chlorinator vessels wherein the peroxide content was allowed to increase or to become concentrated at a level above the level where explosions occur. Thus, by constant flushing of the treating solution with organic peroxide-free hydrocarbons, the organic peroxide concentration is maintained below the explosive level. In other words, by replacing the accumulated hydrocarbon layer by peroxide-free hydrocarbons explosions with their attendant deleterious results are eliminated.

The nature and objects of the present invention having been completely described and illustrated, what I wish to claim as new and useful and to secure by Letters Patent is:

1. A method for removing peroxides from a chlorinating vessel containing an alkaline hypochlorite solution and a petroleum distillate susceptible to peroxide formation which comprises flushing said petroleum distillate from said vessel with a peroxide-free hydrocarbon and thereby maintaining the peroxide concentration in said vessel below about 10 milliequivalents of active oxygen per liter.

2. A method in accordance with claim 1 in which the peroxide-free hydrocarbon is the petroleum distillate treated with said solution.

3. A method in accordance with claim 1 in which the petroleum distillate is a cracked petroleum fraction.

4. A method in accordance with claim 1 in which the petroleum distillate is a catalytically cracked petroleum fraction.

5. In a chlorinating vessel of an alkaline hypochlorite system for treating petroleum distillate susceptible to peroxide formation in which said petroleum distillate accumulates on the surface of said hypochlorite solution in said vessel, the method for preventing spontaneous explosions in said vessel which comprises replacing the accumulated petroleum distillate with a peroxide-free hydrocarbon whereby the organic peroxides content of the contents of said vessel is maintained below about 10 milliequivalents of active oxygen per liter.

6. The method in accordance with claim 5 in which the peroxide-free hydrocarbon is the treated petroleum distillate.

7. The method in accordance with claim 5 in which the petroleum distillate is a cracked petroleum fraction.

8. The method in accordance with claim 5 in which the petroleum distillate is a catalytically cracked petroleum fraction.

9. In a chlorinating vessel of an alkaline hypochlorite system for treating petroleum distillate susceptible to peroxide formation in which said petroleum distillate accumulates on the surface of said hypochlorite solution in said vessel, the method for preventing spontaneous explosions in said vessel which comprises maintaining the concentration of organic peroxides in said vessel below about 10 milliequivalents of active oxygen per liter.

10. The method in accordance with claim 9 in which said concentration of organic peroxides is maintained by flushing the accumulated petroleum distillate from the vessel with a peroxide-free hydrocarbon.

11. The method in accordance with claim 9 in which said concentration of organic peroxides is maintained by adding a caustic insoluble oxidation inhibitor to said vessel.

12. The method in accordance with claim 11 in which the inhibitor is 2,6,tertiary butyl phenol.

References Cited in the file of this patent

UNITED STATES PATENTS

| | | |
|---|---|---|
| 1,545,394 | Cady | July 7, 1925 |
| 2,114,354 | Pummill | Apr. 19, 1938 |
| 2,479,948 | Luten et al. | Aug. 2, 1949 |
| 2,721,166 | Earhart | Oct. 18, 1955 |